US007741127B2

(12) United States Patent
Johnston Bartley et al.

(10) Patent No.: US 7,741,127 B2
(45) Date of Patent: Jun. 22, 2010

(54) METHOD FOR PRODUCING DIESEL EXHAUST WITH PARTICULATE MATERIAL FOR TESTING DIESEL ENGINE AFTERTREATMENT DEVICES

(75) Inventors: Gordon James Johnston Bartley, San Antonio, TX (US); Cynthia Chaffin Webb, San Antonio, TX (US); Imad Abdul-Khalek, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 596 days.

(21) Appl. No.: 11/765,734

(22) Filed: Jun. 20, 2007

(65) Prior Publication Data

US 2007/0289290 A1   Dec. 20, 2007

Related U.S. Application Data

(63) Continuation-in-part of application No. 10/917,245, filed on Aug. 12, 2004, now abandoned, which is a continuation-in-part of application No. 10/213,890, filed on Aug. 6, 2002, now Pat. No. 7,140,874.

(60) Provisional application No. 60/310,345, filed on Aug. 6, 2001.

(51) Int. Cl.
   G01N 1/22    (2006.01)
   G01N 31/10   (2006.01)
   G01M 19/00   (2006.01)
   F01N 3/023   (2006.01)

(52) U.S. Cl. .................. 436/181; 60/276; 73/23.33; 73/114.69; 436/37; 436/155; 436/159; 436/160

(58) Field of Classification Search ............... 73/23.33, 73/114.69; 436/37, 155, 159–160, 181; 60/276, 295, 299, 302

See application file for complete search history.

(56) References Cited

U.S. PATENT DOCUMENTS

| 553,450 | A | | 1/1896 | Cromer |
| 1,102,510 | A | | 7/1914 | Irish |
| 3,030,773 | A | | 4/1962 | Johnson .................. 60/39.65 |
| 3,131,749 | A | | 5/1964 | Davis, Sr. |
| 3,176,751 | A | | 4/1965 | Gerlitz ..................... 158/76 |
| 3,503,715 | A | | 3/1970 | Haensel ................... 23/288 |
| 3,630,024 | A | | 12/1971 | Hopkins ................. 60/39.69 |
| 3,685,740 | A | | 8/1972 | Shepherd ................. 239/400 |
| 3,694,135 | A | | 9/1972 | Dancy et al. ............. 431/265 |
| 3,818,846 | A | | 6/1974 | Reese ..................... 110/8 R |
| 3,890,088 | A | | 6/1975 | Ferri ...................... 431/351 |
| 3,986,386 | A | * | 10/1976 | Beltzer et al. ............ 73/863.12 |
| 4,035,137 | A | | 7/1977 | Arand ..................... 431/285 |
| 4,054,418 | A | | 10/1977 | Miller et al. ............. 23/277 C |
| 4,118,171 | A | | 10/1978 | Flanagan et al. ........... 431/10 |
| 4,270,896 | A | | 6/1981 | Polinski et al. ............ 431/328 |
| 4,345,431 | A | | 8/1982 | Suzuki et al. ............. 60/286 |
| 4,361,028 | A | * | 11/1982 | Kamiya et al. ............ 73/23.33 |
| 4,375,950 | A | | 3/1983 | Durley, III ............... 431/12 |
| 4,383,411 | A | | 5/1983 | Riddel .................... 60/303 |
| 4,567,750 | A | * | 2/1986 | Artmann .................. 73/23.33 |
| 4,651,524 | A | | 3/1987 | Brighton .................. 60/274 |
| 4,747,297 | A | * | 5/1988 | Okayama et al. ........... 73/23.33 |
| 4,845,940 | A | | 7/1989 | Beér ...................... 60/732 |
| 4,878,380 | A | | 11/1989 | Goodman ................. 73/118.1 |
| 5,082,478 | A | | 1/1992 | Oono et al. ................ 55/466 |
| 5,085,577 | A | | 2/1992 | Muller .................... 431/265 |
| 5,140,814 | A | | 8/1992 | Kreutmair et al. ........... 60/303 |
| 5,149,261 | A | | 9/1992 | Suwa et al. ............... 431/207 |
| 5,267,851 | A | | 12/1993 | Washam et al. ............ 431/9 |
| 5,288,021 | A | | 2/1994 | Sood et al. ............... 239/132.5 |
| 5,320,523 | A | | 6/1994 | Stark ...................... 431/353 |
| 5,339,630 | A | | 8/1994 | Pettit ..................... 60/303 |
| 5,396,794 | A | | 3/1995 | Nichols .................. 73/118.1 |
| 5,493,171 | A | | 2/1996 | Wood, III et al. ......... 313/141 |
| 5,529,048 | A | | 6/1996 | Kurihara et al. ........... 123/685 |
| 5,553,450 | A | | 9/1996 | Schnaibel et al. .......... 60/274 |
| 5,584,178 | A | | 12/1996 | Naegeli et al. ............ 60/303 |
| 5,592,924 | A | | 1/1997 | Audisio et al. ............ 123/525 |
| 5,626,014 | A | | 5/1997 | Hepburn et al. ........... 60/274 |
| 5,693,874 | A | | 12/1997 | De La Cruz et al. ....... 73/61.62 |
| 5,713,336 | A | | 2/1998 | King et al. ............... 123/525 |
| 5,826,428 | A | | 10/1998 | Blaschke ................. 60/303 |
| 5,860,277 | A | | 1/1999 | Schnaibel et al. .......... 60/274 |

(Continued)

FOREIGN PATENT DOCUMENTS

EP   0590699 A   4/1994

(Continued)

OTHER PUBLICATIONS

Otto, K. et al., "Effects of Mn Deposits From MMT on Automotive Catalysis in the Absence and Presence of Other Fuel Addatives", Environmental Science and Technology, vol. 12, No. 2, pp. 181-184, Feb. 1978.

(Continued)

Primary Examiner—Arlen Soderquist
(74) Attorney, Agent, or Firm—Chowdhury & Georgakis PC

(57) ABSTRACT

A method of using a burner-based system to produce diesel exhaust gas that contains particulate matter of a desired composition, to simulate the PM matter in exhaust produced by a production-type diesel internal combustion engine.

15 Claims, 2 Drawing Sheets

U.S. PATENT DOCUMENTS

| | | | |
|---|---|---|---|
| 5,899,062 A | 5/1999 | Jerger et al. | 60/274 |
| 5,974,787 A | 11/1999 | Lemire et al. | 60/274 |
| 5,974,788 A | 11/1999 | Hepburn et al. | 60/274 |
| 5,998,210 A | 12/1999 | Hepburn et al. | 436/37 |
| 6,071,113 A | 6/2000 | Tsubouchi et al. | 431/7 |
| 6,269,633 B1 | 8/2001 | van Nieuwstadt et al. | 60/277 |
| 6,298,729 B1 | 10/2001 | Locker et al. | 73/668 |
| 6,301,875 B1 | 10/2001 | Backlund et al. | 60/39.5 |
| 6,327,889 B1 | 12/2001 | Seltzer et al. | 73/1.02 |
| 6,341,487 B1 | 1/2002 | Takahashi et al. | 60/286 |
| 6,378,359 B1 | 4/2002 | Dobson et al. | 73/118.1 |
| 6,382,182 B1 | 5/2002 | Green et al. | 123/420 |
| 6,490,858 B2 | 12/2002 | Barrett et al. | 60/280 |
| 6,586,254 B1 | 7/2003 | Kumar et al. | 436/7 |
| 6,594,990 B2 | 7/2003 | Kuenstler et al. | 60/295 |
| 6,713,025 B1 | 3/2004 | Ivanescu et al. | 422/177 |
| 6,796,165 B2 * | 9/2004 | Abdul-Khalek | 73/28.01 |
| 7,140,874 B2 | 11/2006 | Ingalls, Jr. et al. | 431/185 |
| 7,174,779 B1 | 2/2007 | Kwon | 73/118.1 |
| 2001/0054281 A1 | 12/2001 | Adams et al. | 60/276 |
| 2003/0012700 A1 | 1/2003 | Carnahan | 422/102 |
| 2003/0079520 A1 | 5/2003 | Ingalls, Jr. et al. | 73/23.31 |
| 2004/0007056 A1 | 1/2004 | Webb et al. | 73/118.1 |
| 2004/0025580 A1 | 2/2004 | Webb et al. | 73/118.1 |
| 2004/0028588 A1 | 2/2004 | Webb et al. | 423/213.2 |
| 2004/0237636 A1 | 12/2004 | Bartley et al. | 73/118.1 |
| 2005/0042763 A1 | 2/2005 | Anderson et al. | 436/137 |

FOREIGN PATENT DOCUMENTS

| | | |
|---|---|---|
| EP | 000895024 A2 | 2/1999 |
| EP | 000961013 A2 | 12/1999 |
| FR | 2674333 A1 | 9/1992 |
| GB | 2329853 | 4/1999 |
| GB | 2356826 | 6/2001 |
| JP | 51111927 | 10/1976 |
| JP | 5649820 | 5/1981 |
| JP | 0472410 | 3/1992 |
| JP | 6264740 | 9/1994 |
| JP | 07198127 | 8/1995 |
| JP | 11159386 | 6/1999 |
| JP | 11270808 | 10/1999 |
| JP | 2002365203 | 12/2002 |
| KR | 100680363 | 2/2007 |

OTHER PUBLICATIONS

Gerhold, B.W. et al., "Operation of Homogeneous Exhaust Manifold Reactor", Symposium (International) on Combustion, vol. 15, pp. 1225-1232, 1975.

Wade, W.R. et al., "Thermal and Catalytic Regeneration of Diesel Particulate Traps", Society of Automotive Engineers, vol. SP-537, pp. 61-85, 1983.

Cullis, C.F. et al., "A Novel Engine-Free Dilution-Tunnel System for the Collection of Particulate Matter Formed During Combustion", Journal of Physics E: Scientific Instruments 1984, vol. 17, No. 4, pp. 317-322, 1984.

Okazoe, H. et al., "Study of SiC Application to Diesel Particulate Filter (Part 2): Engine Test Results", Society of Automotive Engineers, vol. SP-943, pp. 121-128, 1993.

Ciambelli, P. et al., "The Role of NO In the Regeneration of Catalytic Ceramic Filters for Soot Removal From Exhaust Gases", Catalysis Today, vol. 60, pp. 43-49 2000.

Hoard, J. et al., "Diesel Exhaust Simulator: Design and Application to Plasma Discharge Testing", Society of Automotive Engineers, vol. SP-1759, pp. 97-109, 2003.

Herskowitz, M. et al., CO Oxidation on Pt Supported Catalysts. Kinetics and Multiple Steady States, Canadian Journal of Chemical Engineering 61, pp. 194-199, 1983.

Weisweiler, W. et al.; "Simulation of a Driving Cycle in Laboratory: an Approach for Testing Catalysts Suitable for Automotive Exhaust NOx Abatement Under Lean Conditions"; Chemical Engineering and Processing 37, 1998, pp. 229-332, 1998.

McCullough, G. et al.; "An Experimental Evaluation of the Oil Fouling Effects of Two-Stroke Oxidation Catalylsts"; Society of Automotive Engineers, Inc., 1998, pp. 29-40, 1998.

Jovanovic, Modified Apparatus for the Simulation of Engine Exhaust Emissions, Goriva Maziva, vol. 23(1), pp. 33-38, 1984.

Southwest Research Institute Marketing Brochure, Fuel/Oil Catalyst Aging System, Feb. 1999.

Hepburn, A Comparison Between the Combustion of Isooctane, Methanol, and Methane in Pulse Flame Combustors with Closed Loop A/F Control, SAE Technical Paper 920799, SAE International, 1992.

Southwest Research Institute, Further Advances in Exhaust Aftertreatment, Promotional Brochure, San Antonio, Texas, Feb. 1994.

Ingalls et al., Development of Catalyst Poisoning Evaluation Procedure, 08-9920, Internal Research & Development Program, Annual Report, p. 53, Southwest Research Institute, San Antonio, Texas, 1996.

Ingalls et al., Develop and Test an Apparatus to Evaluate Fuel and Lube Oil Effects on Automotive Catalysts, 08-9949, Internal Research & Development Program, Annual Report, Southwest Research Institute, San Antonio, Texas, pp. 53-54, 1996.

Southwest Research Institute, Unique SwRI-Developed Procedures and Analytical Tools to Assist Vehicle Manufacturers in Meeting SULEV Standards, Southwest Research Institute News, Southwest Research Institute, San Antonio, Texas, Feb. 23, 1998.

Casinhas et al., A Pyrolysis Cell As Simulator for an Automobile Catalytic Converter, Vacuum, vol. 52, Elsevier Science Ltd., pp. 89-97, 1999.

Webb et al., Development of a Methodology to Separate Thermal from Oil Aging of a Catalyst Using a Gasoline-Fueled Burner System, SAE Technical Paper 2003-01-0663, SAE International, 2003.

United States Depaitment of Energy, Taking an Alternative Route—Facts about CNG & LPG Conversion, http://pugetsound cleancities.org/pdfs/cng_lpg_conversionfacts.pdf, Alternative Fuel Information, U.S. Department of Energy.

Southwest Research Institute, Catalytic Converter Durability Testing, Southwest Research Institute- Department of Emissions Research, Promotional Brochure, San Antonio, Texas.

Otto et al., ALaboratory Method for the Simulation of Automobile Exhaust and Studies of Catalyst Poisoning, Journal of the Air Pollution Control Association, vol. 24, No. 6, pp. 596-600, Jun. 1974.

Webb et al., PC-Based Control of a Gasoline-Fueled Burner Aging Test Stand to Simulate Engine Exhaust, LabVIEW for Automotive, Telecommunications, Semiconductor, Biomedical, and other Applications, National Instuments Virtual, pp. 29-34, 2000.

Selby, Development and Significance of the Phosphorus Emission INdex of Engine Oils, 13th International Colloquium Tribolgy—Lubricants, Materials, and Lubrication, pp. 1-9, 2002.

Webb et al., Catalyst Aging Evaluation with Exposure to 0.06 and 0.11 Percent Phosphorus Oils Using the FOCUS Burner System, JSAE 20030269, SAE 2003-01-1999, Society of Automotive Engineers, Inc., 2003.

Williamson, Catalyst Deactivation Due to Glaze Formation From Oil-Derived Phosphorus and Zinc, SAE Technical Paper 741406, SAE International, 1984.

Joy et al., Influence of Phosphorus on Three-Component Control Catalysts: Catalyst Durability and Characterization Studies, SAE Technical Paper 852099, SAE International, 1985.

Drury et al., The Effect of Lubricant Phosphorus Level on Exhaust Emissions in a Field Trial of Gasoline Engine Vehicles, SAE Technical Paper 940745, SAE International, 1994.

Ueda et al., Engine Oil Additive Effects on Deactivation of Monolithic Three-Way Catalysts and Oxygen Sensors, SAE Technical Paper 940746, SAE International, 1994.

Cully et al., The Impact of Passenger Car Motor Oil Phosphorus Levels on Engine Durability, Oil Degradation, and Exhaust Emission in a Field Trial, SAE Technical Paper 952344, SAE International, 1995.

Cully et al., The Impact of Passenger Car Motor Oil Phosphorus Levels on Automotive Emissions Control Systems, SAE Technical Paper 961898, SAE International, 1996.

Ball et al. Application of Accelerated Rapid Aging Test (RAT) Schedules with Poisons: The Effects of Oil Derived Poisons, Thermal Degradation, and Catalyst Volume on FTP Emissions, SAE Technical Paper 972846, SAE International, 1997.

Cernansky, N. P. et al., Destruction of Oxygenate/Odor Formation in a High Temperature Flat Flame Burner Society of Automotive Engineers, [Special Publication] SP 1983, SP-557, pp. 109-117, 1983.

Jobson et al., Spatially Resolved Effects of Deactivation on Field-Aged Automotive Catalysts, SAE Technical Paper 910173, SAE International, 1991.

Beck et al., Impact of Sulfur on the Performance of Vehicle-Aged Palladium Monoliths, Applied Catalysis B: Environmental 6, vol. 185-200, 1995.

Minutes—Oil Protection of Emicssion System Test II Task Force Held on Aug. 19, 1999, ASTM, (Redacted) Sep. 27, 1999.

Minutes—Oil Protection of Emission System Test II Task Force Held on May 23, 2000, ASTM, (Redacted) Jun. 8, 2000.

Minutes—Oil Protection of Emission System Test (OPEST) II Task Force Held Apr. 4, 2001, ASTM, San Antonio, TX, (Redacted), May 2, 2001.

Cambustion DPG Diesel Particulate Generator Preliminary Information, 9 pages, Feb. 16, 2004.

Variable Soot Generator VSG—3000, http://www.palas.de/engl/produkte/trock_vsg.htm, 2 pages, Jan. 3, 2007.

* cited by examiner

METHOD FOR PRODUCING DIESEL EXHAUST WITH PARTICULATE MATERIAL FOR TESTING DIESEL ENGINE AFTERTREATMENT DEVICES

RELATED APPLICATION

This application is a continuation-in-part of U.S. patent application Ser. No. 10/917,245 filed Aug. 12, 2004, now abandoned, which is a is a continuation-in-part of U.S. patent application Ser. No. 10/213,890, filed Aug. 6, 2002, now U.S. Pat. No. 7,140,874, which claims priority to 60/310,345 filed Aug. 6, 2001, the contents of which are hereby incorporated by reference.

This application is related to U.S. patent application Ser. No. 11/470,471 filed Sep. 6, 2006, now U.S. Pat. No. 7,625,201; U.S. patent application Ser. No. 11/420,393 filed May 25, 2006, now U.S. Pat. No. 7,277,801; U.S. patent application Ser. No. 11/326,983 filed Jan. 6, 2006, now U.S. Pat. No. 7,347,086; U.S. patent application Ser. No. 10/917,230 filed Aug. 12, 2004, now U.S. Pat. No. 7,212,926; U.S. patent application Ser. No. 10/918,330 filed Aug. 12, 2004, now U.S. Pat. No. 7,412,335; U.S. patent application Ser. No. 10/847,034 filed May 17, 2004, now U.S. Pat. No. 7,299,137; U.S. patent application Ser. No. 10/458,023 filed Jun. 10, 2003, now U.S. Pat. No. 7,175,422; U.S. patent application Ser. No. 10/439,146 filed May 15, 2003, now U.S. Pat. No. 6,983,545 B2; and U.S. patent application Ser. No. 10/457,916 filed Jun. 10, 2003, now abandoned.

TECHNICAL FIELD OF THE INVENTION

The present application relates to using a burner-based test system to produce diesel exhaust for testing diesel exhaust aftertreatment devices.

BACKGROUND OF THE INVENTION

Numerous test methods have been used in the past to simulate aging and regeneration of diesel aftertreatment components. The use of production diesel engines for such testing has presented many disadvantages including inconsistent operability, intensive maintenance, and expensive operating costs.

One component of diesel exhaust is unburned carbon particulates. The particulates generally are removed from the exhaust using a diesel particulate filter. In the past, a diesel particulate filter was aged by exposing it to diesel exhaust created by a diesel engine, thereby loading the filter with particulates. The diesel engine could be installed on a test stand in a laboratory or on a motor vehicle. The engine had to be run cyclically at various speed and load conditions to simulate aging of the diesel particulate filter.

Because of difficulties associated with using engines, burner-based systems have been developed to produce exhaust and otherwise simulate the operating conditions for various aftertreatment devices.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to using a burner-based system to produce diesel exhaust gas, typically for the purpose of testing diesel exhaust aftertreatment devices. The use of this system instead of a diesel engine lowers operating costs, reduces test variability, and increases control of the exhaust gas composition, pressure, mass flow rate, and temperature.

U.S. Patent Publication No. 2003/0079520, incorporated herein by reference, describes a burner-based exhaust generation system, without certain features described herein but otherwise suitable for testing exhaust aftertreatment devices. The system comprises: (1) an air supply system to provide air for combustion to the burner, (2) a fuel system to provide fuel to the burner, (3) a burner system to combust the air and fuel mixture and to provide the proper exhaust gas constituents, (4) a heat exchanger to control the exhaust gas temperature, (5) an oil injection system, and (6) a computerized control system. The system may be used to evaluate the effects of individual variables on the long term performance of exhaust aftertreatment devices. It produces exhaust gas with a composition and temperature corresponding to that produced by the internal combustion engine of a motor vehicle.

Figure 1:
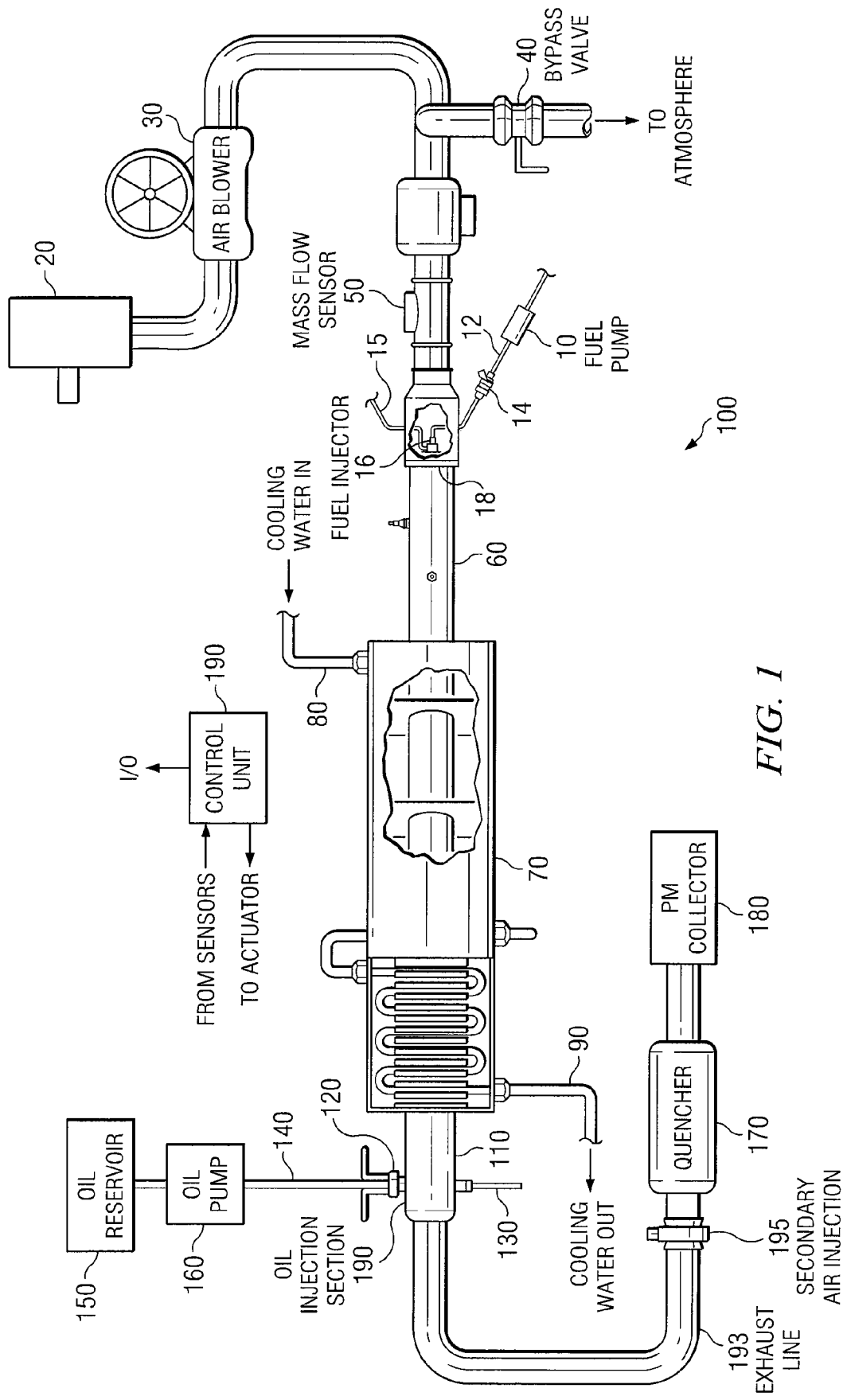
FIG. 1 illustrates a burner-based system for generating diesel exhaust.

FIG. 1 illustrates a burner-based exhaust generation system 100, especially suited for producing diesel exhaust with a composition matching that produced by production type diesel-fueled engines. It has many of the same elements described in U.S. Publication No. 2003/0079520, but has additional features that make it especially suitable for generating diesel exhaust including particulate matter (PM) having desired characteristics.

More specifically, system 100 produces a flow of exhaust gas with a composition and temperature corresponding to the exhaust flow produced by a diesel-type internal combustion engine. The exhaust gas is produced by combusting diesel fuel and contains particulate matter (PM) of a desired composition. The effect of extended driving conditions and elevated temperatures on the composition of the exhaust gas and its PM can be simulated. The system can also simulate the effects of various additives and contaminants from the engine.

In the example of FIG. 1, the PM is collected in a collector 180. In other applications, an emissions control device can be installed on the exhaust line upstream of, downstream of, or in place of the collector. Examples of emissions control devices that may be tested using system 100 include but are not limited to catalyzed and non-catalyzed diesel particulate filters (DPFs), lean NOx traps (LNTs), selective reduction catalysts (SRCs), and diesel oxidation catalysts (DOCs). The system is capable of "aging" the emissions control device, which can then be evaluated, and if desired, performance tested on an actual vehicle.

System 100 has the following subsystems: (1) an air supply system to provide air for combustion to the burner, (2) a fuel system to provide fuel to the burner, (3) a burner system to combust the air-fuel mixture and provide the proper exhaust gas constituents, (4) a heat exchanger to control the exhaust gas temperature, (5) an oil injection system, (6) a secondary air injection system, (7) a quench zone, (8) a collector, and (9) a computerized control system.

Combustion Air Supply System

An air blower 30 draws ambient air through an inlet air filter 20 and exhausts a pressurized stream of air. A mass air flow sensor 50 monitors air flow. The volume of air supplied is set by adjusting bypass valve 40 to produce a desired flow rate of air.

The air blower 30, filter 20, and the mass air flow sensor 50 may be of any conventional design. An example of a suitable air blower 30 is an electric centrifugal blower. Control unit 190 may be used to actuate and/or receive data from the various elements of the air supply system.

A features of system 100 is that its burner 60 may be deactivated, and blower 30 used to cool system 100 (or any part of system 100) in a matter of minutes. Immediately after cooling, system 100 can then be reactivated for additional testing. Thus, system 100 offers improved repeatability and reduced cool down time.

Fuel Supply System

A fuel pump 10 pumps engine fuel through a fuel line 12 to a fuel control valve 14. An example of a suitable fuel control valve 14 is a solenoid valve that receives a pulse-width modulated signal from control unit 190, and regulates the flow of fuel to the burner 60 in proportion to the pulse width. Via the fuel line 12, fuel is delivered to a fuel spray nozzle 16 in the burner 60.

Burner

Burner 60 is designed to produce a desired combustion of the fuel and air. In the example of this description, burner 60 is a swirl-stabilized burner capable of producing continuous combustion at rich, lean, or stoichiometric air-fuel ratios.

Figure 2:
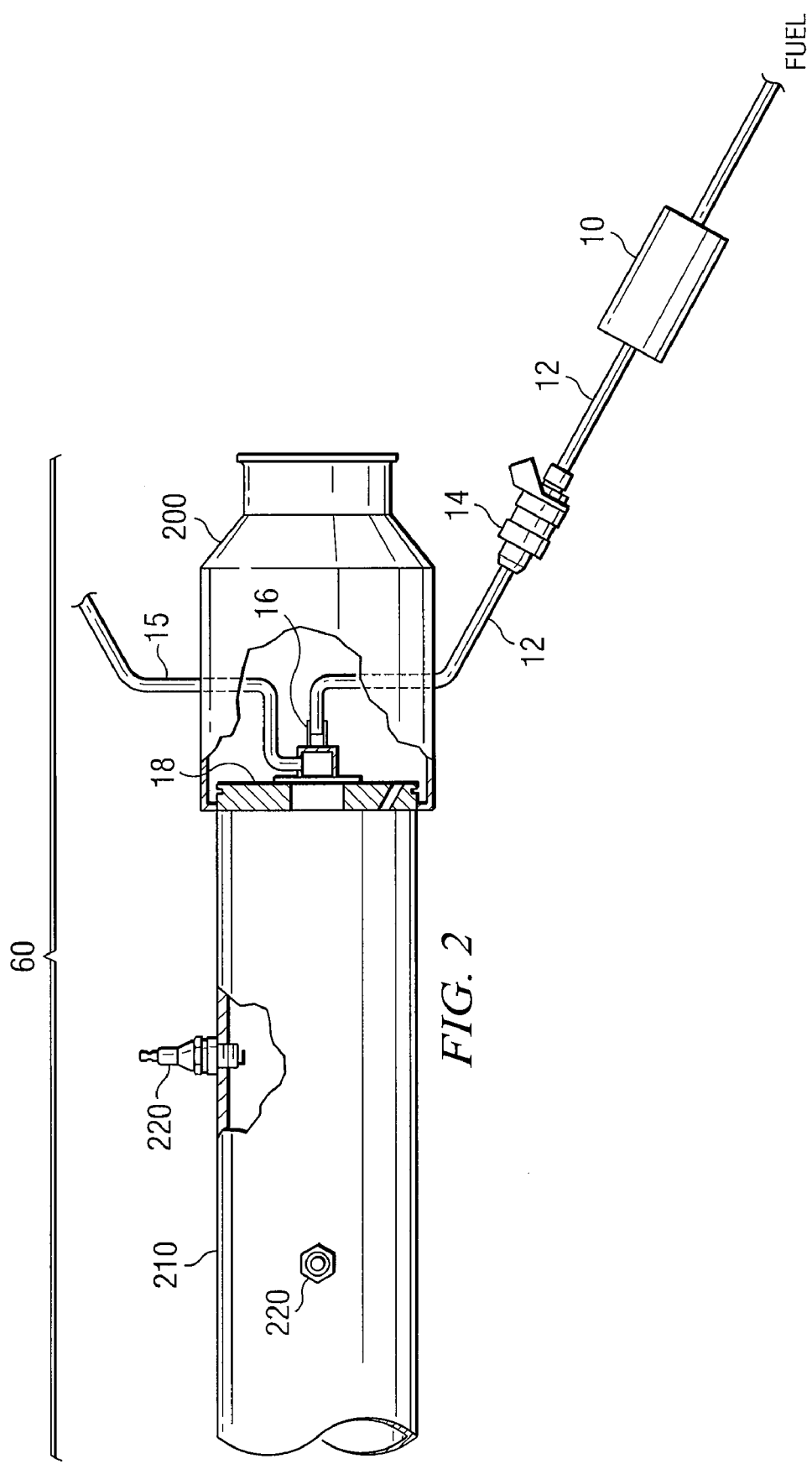
FIG. 2 illustrates the burner of FIG. 1 in further detail.

FIG. 2 illustrates burner 60 in further detail. Burner 60 has both a plenum chamber 200 and a combustion tube 210, separated by swirl plate 18. The combustion tube 210 is constructed of material capable of withstanding extremely high temperatures. Preferred materials include, but are not necessarily limited to INCONEL or stainless steel, and optionally can have a quartz window for visual observation of the resulting flame pattern.

Air and fuel are separately introduced into the burner 60. Air from mass flow sensor 50 is ducted to the plenum chamber 200, then through the swirl plate 18 into the burner tube 210.

The swirl plate 18 is equipped with a fuel injector 16, implemented as an air-assisted fuel spray nozzle 16 at the center of the swirl plate 18. The swirl plate 18 has a central bore, and spray nozzle 16 is fitted to the swirl plate 18 at this central bore using suitable attachment means.

Fuel from the fuel supply line 12 is delivered to the spray nozzle 16, where the fuel is mixed with compressed air from air-assist line 15. The mixture is sprayed into the combustion tube 210. The compressed air line 15 provides high pressure air to assist in fuel atomization.

Swirl plate 18 is capable of producing highly turbulent swirling combustion, so as to provide a complex pattern of collapsed conical and swirl flow in the combustion area. The flow pattern created by the swirl plate 18 involves the interaction of a number of jets bored through swirl plate 18. The arrangement and angling of these jets dictate how they direct air. For example, "turbulent jets" may be used to direct the air toward the central bore. Other jets may be used to direct air from the outer circumference of the swirl plate 18. The precise dimensions and angular orientation of the jets may vary. The jets may further be used to prevent the flame from contacting the fuel spray nozzle 16.

Combustion tube 210 is equipped with one or more spark igniters 220. In a preferred embodiment, three substantially equally spaced spark igniters 220 are located around the circumference of the combustion tube in the gas "swirl path" created by the swirl plate 18. An example of a suitable igniter is a marine spark plug.

Swirl plate 18 may be implemented as a substantially circular disc having a thickness sufficient to fix the air flow pattern and to create an "air shroud" that is effective to protect the fuel injector 16. The swirl plate 18 is made of substantially any material capable of withstanding high temperature, a preferred material being stainless steel.

In some embodiments, suitable for combustion of low volatility fuels, combustion tube 210 is further equipped with ceramic foam located downstream from the spray nozzle 16. Substantially any suitable foam may be used, such as SiC ceramic foam.

Heat Exchanger

Referring again to FIG. 1, the exhaust from the burner 60 is routed to a heat exchanger 70. The heat exchanger 70 may be of any conventional design known to a person of ordinary skill in the art. In the example of this description, the heat exchanger 70 consists of two sections. An upstream section consists of a water jacketed tube. A downstream section is a vertical cross flow shell and tube heat exchanger. The vertical cross flow design minimizes steam formation and steam trapping within the cooling tubes.

Heat exchanger 70 is provided with an inlet water line 80 and an outlet water line 90 which supply and drain cooling water. The heat exchanger 70 cools the exhaust gas to reach (or assist in reaching) a desired exhaust gas temperature.

Oil Injection System

Downstream from the burner 60, the exhaust gas is routed past an optional oil injection section 110, which may be used to introduce a precisely controlled amount of lubricating oil into the exhaust stream. The oil injection section 110 provides an atomized oil spray comprising oil droplets with a sufficiently small diameter to vaporize and oxidize the oil before it reaches the emissions control device 170. The oil injection system 110 may include means for metering the consumption rate and oxidation state (unburned, partially burned, or fully burned) of the oil delivered downstream the oil injection.

In the example of FIG. 1, lubricant (or other liquid) is withdrawn from an oil reservoir 150 by means of an oil pump 160. Substantially any type of pump may be used, preferably a pump which feeds the lubricant from the reservoir through an oil injection line 140 and into a water cooled probe 120 from which the oil is injected into the exhaust gas.

As explained below, for generating exhaust gas with desired PM composition, the oil injector 120 is typically used to inject engine lubricant or additives commonly found in such lubricants. Regardless of whether it is oil or additives to be injected, injector 120 is referred to herein as an "oil" injector.

Secondary Air Injection

Secondary air injector 195 supplies air (or any other gas) into the exhaust flow line 193 downstream the heat exchanger 70. As explained below, for generating exhaust gas with desired PM composition, the air injector 120 is typically used to inject oxygen into the exhaust gas, by injecting either air or oxygen. Regardless of whether it is air or oxygen to be injected, injector 195 is referred to herein as an "oxygen" injector.

Control Unit

Referring again to FIG. 1, control unit 190 receives input from various sensors associated with system 100 and delivers control signals to its various actuators. Control unit 190 may be implemented with conventional computing equipment, including processors and memory. It is equipped with suitable input devices, a monitor, and a multi-function data acquisition card, connected to a digital relay module to monitor and record control system information, and to control system electronics. Control unit 190 is programmed to run various simulation programs.

The sensors include sensor 50 and may further include sensors for measuring various gas contents and flows. Various measured parameters collected by control unit 190 may include: the mass air flow in the system, the air/fuel ratio (linear and EGO), the exhaust gas temperature at the outlet from the heat exchanger, the exhaust gas temperature at the inlet to the emissions control device, and the exhaust gas temperature at the outlet from the emissions control device, and various chemical constitutants of the exhaust. The information measured by the sensors is transmitted by electronic signals to control unit 190, which measures all of the monitored parameters on a periodic basis and stores the measurement data in memory.

The actuators controlled by control unit 190 include the various injectors, pumps, valves, and blowers described above. More specifically, control unit 190 controls the air-to-fuel ratio by modulating the fuel delivered to the fuel injector 16 under either an open loop or closed loop control configuration. Control unit 190 further provides a means to control ignition, air assist to the fuel injector, auxiliary air, fuel feed, blower air feed, and oil injection. An example of a suitable control system would be a proportional integral derivative (PID) control loop.

Control unit 190 monitors system 100 for safety. For example, it may be used to verify that the burner is lighted and that the exhaust is within specified limits for both temperature and air to fuel ratio. The control unit 190 is programmed to identify and address failure modes, and to monitor and control system 100 to a safe shutdown if a failure mode is detected.

Interactive interface programming of control unit 190 permits an operator to develop and run various aging cycles. The operator can use control unit 190 to investigate the effects of exposure to various oils and other fuel contaminants or additives. The inlet temperature to the emissions control device 170 can be adjusted over a wide range of temperatures.

Control unit 190 may be used to switch power to the blowers and fuel pump, as well as control the air assisted fuel injectors, burner spark, oil injection, and auxiliary air. System temperatures, mass air flow for the burner air, and the burner air to fuel ratio are measured and converted to engineering units. The software program uses measured data to calculate total exhaust flow and burner air to fuel ratio, and to check conditions indicative of a system malfunction. The burner air to fuel ratio may be controlled as either open or closed loop, maintaining either specified fuel flow or specified air to fuel ratio. Air to fuel ratio control is achieved by varying the rate of fuel delivered to the burner. Whenever necessary, open loop control can be activated allowing the operator to enter a fixed fuel injector pulse duty cycle. Closed loop control can be activated in which the actual burner air to fuel ratio is measured and compared to the measured value of the air to fuel setpoint and then adjusting the fuel injector duty cycle to correct for the measured error.

Generating Diesel Exhaust

Control unit 190 may be programmed to produce diesel exhaust with specified amounts of a particular exhaust component or components, for example, to simulate diesel exhaust produced in cold climates, at high altitudes, during engine acceleration conditions (i.e., increased NOx production), during engine deceleration conditions (i.e., decreased NOx production), and combinations thereof.

Additionally, an aftertreatment device may be positioned to assist in simulating a preferred diesel exhaust. For instance, system 100 may include a NOx reducing catalyst upstream of the collector 180, to simulate NOx reduced exhaust gas into the collector. In the alternative, system 100 may be fueled and operated to generate NOx reduced exhaust gas without using a reducing device.

The main components of diesel exhaust include but are not necessarily limited to carbon monoxide, carbon dioxide, oxides of nitrogen (NOx), oxides of sulfur, hydrocarbons (HCs), unburned carbon particulate matter (PM), oxygen, and nitrogen. Other compounds also may be included in the exhaust gas depending on the desired test conditions. Preferred compounds comprise components selected from the group consisting of phosphorous, zinc, sulfur, calcium, magnesium, urea, ammonia, and combinations thereof. The quantity and composition of diesel exhaust may vary depending on a number of factors to be simulated, including but not necessarily limited to: wear and tear on engine moving parts, quality of lubrication oil, lubrication oil consumption, quality of the diesel fuel, type of engine, engine tuning, fuel pump setting, the workload demand on the engine, engine temperature, and engine maintenance. Sulfur dioxide is generated from the sulfur present in diesel fuel and lubricant oil, and the concentration of sulfur dioxide in the exhaust gas depends on the sulfur content of the fuel and the lubricant oil.

Diesel particulate matter (PM) is formed during the combustion process in a diesel engine and during the subsequent travel of the exhaust gases within the exhaust system. The PM generally comprises carbon, metal, adsorbed organic compounds (i.e., hydrocarbons), and varying amounts of sulfates, nitrates, and combinations thereof. The formation of PM can be simulated by using various forms of carbon power (carbon black) or by operating the burner under fuel-rich conditions. PM also contains varying amounts of sulfate from fuel and oil sulfur, and a soluble organic fraction originating mostly from lubricating oil.

Not only is PM a composite material, but its components themselves are responsible for PM formation and its characteristics. The process by which the particulates are formed is one of nucleation and agglomeration.

Diesel particulates can be very fine. The primary (nuclei) carbon particles have an average diameter from about 0.01 microns to about 0.08 microns, while the aggregates have an average diameter from about 0.08 microns to about 1 microns.

As stated above, the composition of the PM also depends on engine operating conditions. The actual composition of the particulates also depends on the thermodynamic conditions in the diesel exhaust and the particulate collection system being used. For example, under normal engine operating conditions, particles can become coated with adsorbed and condensed high molecular weight organic compounds.

Because PM originates in the engine cylinder as a result of high pressure and temperature, and is affected by fuel to air ratio in various regions of the combustion chamber, it is not trivial to re-create PM other than by means of a diesel compression ignition engine. A feature of system 100 is that it may be programmed and operated to generate a diesel exhaust comprising a desired composition and size of diesel particulates. System 100 can generate the same PM as generated by a diesel engine.

Referring to FIG. 1, burner 60 is used to generate an initial PM precursor. Burner 60 is operated rich of stoichiometry to induce incomplete fuel and oil combustion, and thereby to provide nascent PM. By appropriately programming control unit 190, the diesel fuel can be doped with lubricating oil or lubricating oil additives. In the same manner, the sulfur content of the fuel and/or oil can be controlled, as well as ash-forming components of the oil.

The multiphase mixture from burner 60 flows through heat exchanger 70 for cooling. The rate of cooling is controlled, such as by varying the residence time in the heat exchanger 70, to achieve desired nucleation and agglomeration of the PM.

Downstream of heat exchanger 70, the exhaust is "matured", using either or both the oil injector 120 or the oxygen injector 195. Injector 195 is used to inject gases, such as air or oxygen. In particular, injector 195 may be used to raise the oxygen content to simulate the oxygen content of diesel exhaust. A typical oxygen content is between 2 and 10 percent by volume, and most commonly, between 4 and 8 percent. Oxygen in the exhaust gas during PM nucleation and agglomeration is important with regard to the final PM composition.

The air or oxygen is injected where the exhaust gas is at a predetermined temperature. A suitable temperature at the point of injection is less than 650 degrees C., and more typically, 500 degrees C. or less. Injection at a higher temperature can cause undesired combustion of the PM being formed.

The in-exhaust oil injector 120 can be used either upstream or downstream of the gas injector 195. Oil or oil additive components injected via injector 120, as compared to being added to the fuel, is less combusted and can be used to simulate the part of the PM formation process that does not directly result from combustion in the engine combustion chambers. This oil injection is used primarily to modify the soluble organic fraction of the PM. Various additives that are known to encourage the production of ash in the exhaust can be added via the oil injector.

The PM laden exhaust gas is quenched in a quench zone 170, which cools the exhaust. This may be accomplished using an ice bath or other chiller process. The quenching locks the PM in its present form. If desired, the PM may be collected in a collector 180.

It should be understood that for particular desired PM characteristics, not all stages of the above-described process may be necessary.

Testing Diesel Particulate Filters

A diesel particulate filter is any apparatus that collects and retains particulates from diesel exhaust contacting the filter. In general, a diesel particulate filter consists of a porous substrate or ceramic fiber that traps the particulates but permits gases in the diesel exhaust to pass through.

Generally, diesel particulate filter aging is evidenced by a reduction in filtration efficiency. The reduction in filtration efficiency generally is due to multiple PM binding/regeneration cycles, which may lead to ash buildup in the diesel particulate filter. Aging also depends on numerous factors including but not necessarily limited to exposure time of the diesel particulate filter to the exhaust gas, the flowrate of the exhaust gas through the filter, the amount of pressure drop during use, the porosity of the filter, the filter materials used, and ambient humidity.

During use of system 100 to age a diesel particulate filter, the flowrate generally is maintained at from about 0 to about 300 standard cubic feet per minute (scfm) and the exhaust temperature generally is maintained at from about 150 to 650 degrees C., typically from about 150 to 300 degrees C. for an extended duration. Exposure times typically are determined according to the type of diesel particulate filter being tested, the components of the exhaust gas product, the desired aging conditions to be simulated, and combinations thereof.

Regeneration of a diesel particulate filter involves removal of the particulate matter. Generally, the exhaust gas temperature is increased to a temperature sufficiently high to autoignite and sustain combustion of the particulate matter on the filter. Regeneration temperatures generally are from about 300 to 650 degrees C., preferably about 350 degrees C. or higher for catalyzed diesel particulate filter depending on catalyst formulation, and about 600 degrees C. or higher for most uncatalyzed diesel particulate filters. The contaminant particulates generally must attain a minimum temperature of about 500 to 650 degrees C. to auto ignite and sustain combustion. The desired temperature is determined by factors including, but not necessarily limited to the type of diesel particulate filter being tested, the fuel sulfur levels, NOx levels, oxygen levels, PM levels, and combinations thereof.

System 100 is capable of generating thermal excursions of even higher temperatures to simulate aging and to regenerate various aftertreatment devices.

During regeneration, for rapid oxidation of the particulate matter, there must be sufficient free oxygen available, preferably from about 3 to 20% of the exhaust stream. The temperature and oxygen levels are maintained until the regeneration is complete. System 100 may be programmed to reproduce a desired aging cycle and/or a desired regeneration cycle, alone or in combination, once or multiple times, as desired.

Persons of ordinary skill in the art will recognize that many modifications may be made to the present application without departing from the spirit and scope of the application. The embodiment described herein is meant to be illustrative only and should not be taken as limiting the application, which is defined in the claims.

What is claimed is:

1. A method of using a burner-based system to generate exhaust gas containing particulate matter (PM) that simulates PM produced by a diesel powered internal combustion engine, comprising:
   using a burner to receive air and fuel and to combust the air and fuel to produce the exhaust gas and nascent PM in the exhaust gas;
   using a heat exchanger to cool the exhaust gas downstream of the burner to a temperature not greater than 650 degrees Centigrade;
   using an oxygen injector to inject a pre-determined amount of oxygen into the exhaust, thereby providing the exhaust gas with an oxygen content of 2-10 percent by volume;
   using a quencher downstream the oxygen injector, to cool the exhaust to a temperature sufficiently low to lock the composition of the PM;
   and using a computerized control system to control the amount and timing of fuel and oxygen supplied to the burner and oxygen injector.

2. The method of claim 1, wherein the burner is operated rich of stoichiometry.

3. The method of claim 1, further comprising the step of doping the fuel with sulfur compounds.

4. The method of claim 1, further comprising the step of doping the fuel with lubricating oil or at least one lubricating oil additive.

5. The method of claim 1, further comprising the step using an oil injector, located between the heat exchanger and the quencher, to inject a pre-determined amount of engine lubricant or additive into the exhaust gas, thereby providing a pre-determined amount of soluble organic fraction into the exhaust gas.

6. The method of claim 1, further comprising the step using an oil injector, located between the heat exchanger and the quencher, to inject a pre-determined amount of additive into the exhaust gas, thereby providing ash in the exhaust gas.

7. The method of claim 1, wherein the step of using a heat exchanger is performed by controlling the residence time of the exhaust gas in the heat exchanger.

8. A method of using a burner-based system to test an emissions control device that treats exhaust gas containing particulate matter (PM), comprising:

using a burner to receive air and fuel and to combust the air and fuel to produce the exhaust gas and nascent PM in the exhaust gas;

using a heat exchanger to cool the exhaust gas downstream of the burner to a temperature not greater than 650 degrees Centigrade;

using an oxygen injector to inject a pre-determined amount of oxygen into the exhaust, thereby providing the exhaust gas with an oxygen content of 2-10 percent by volume;

using a quencher downstream the oil injector and the oxygen injector, to cool the exhaust to a temperature sufficiently low to lock the PM composition;

delivering the exhaust gas to the emissions control device;

and using a computerized control system to control the amount and timing of fuel and oxygen supplied to the burner and oxygen injector.

9. The method of claim 8, wherein the burner is operated rich of stoichiometry.

10. The method of claim 8, further comprising the step of doping the fuel with sulfur compounds.

11. The method of claim 8, further comprising the step of doping the fuel with lubricating oil or at least one lubricating oil additive.

12. The method of claim 8, further comprising the step using an oil injector, located between the heat exchanger and the quencher, to inject a pre-determined amount of engine lubricant or additive into the exhaust gas, thereby providing a pre-determined amount of soluble organic fraction into the exhaust gas.

13. The method of claim 8, wherein the step of using a heat exchanger is performed by controlling the residence time of the exhaust gas in the heat exchanger.

14. The method of claim 8, wherein the emissions control device is a diesel particulate filter.

15. The method of claim 8, wherein the emissions control device is a diesel particulate filter, and wherein the control system is programmed to operate the system in regeneration mode.

* * * * *